United States Patent [19]

Nicolaisen

[11] 3,957,955

[45] May 18, 1976

[54] PROCESS FOR PREPARATION OF SODIUM AMMONIUM PHOSPHATE

[75] Inventor: Bernard H. Nicolaisen, Houston, Tex.

[73] Assignee: Olin Corporation, New Haven, Conn.

[22] Filed: Dec. 30, 1974

[21] Appl. No.: 537,235

[52] U.S. Cl. .............................. 423/312; 423/305; 423/438
[51] Int. Cl.² ..................... C01B 15/16; C01B 25/26
[58] Field of Search .................... 423/305, 307–313, 423/237, 238, 356, 357, 437, 438

[56] References Cited
UNITED STATES PATENTS

| 3,337,297 | 9/1967 | Cook et al. ........................ 423/305 |
| 3,531,242 | 9/1970 | Hayatawa et al. .................. 423/310 |
| 3,826,815 | 7/1974 | Maurovic ........................... 423/356 |

FOREIGN PATENTS OR APPLICATIONS

| 561,078 | 10/1932 | Germany ........................... 423/312 |

*Primary Examiner*—Oscar R. Vertiz
*Assistant Examiner*—Gregory A. Heller
*Attorney, Agent, or Firm*—Robert L. Andersen

[57] ABSTRACT

A solution of sodium ammonium phosphate is prepared by reacting monoammonium phosphate with sodium carbonate in a vertical column having vapor-liquid contact means at a temperature in the range of 150°F. up to the boiling point.

4 Claims, 1 Drawing Figure

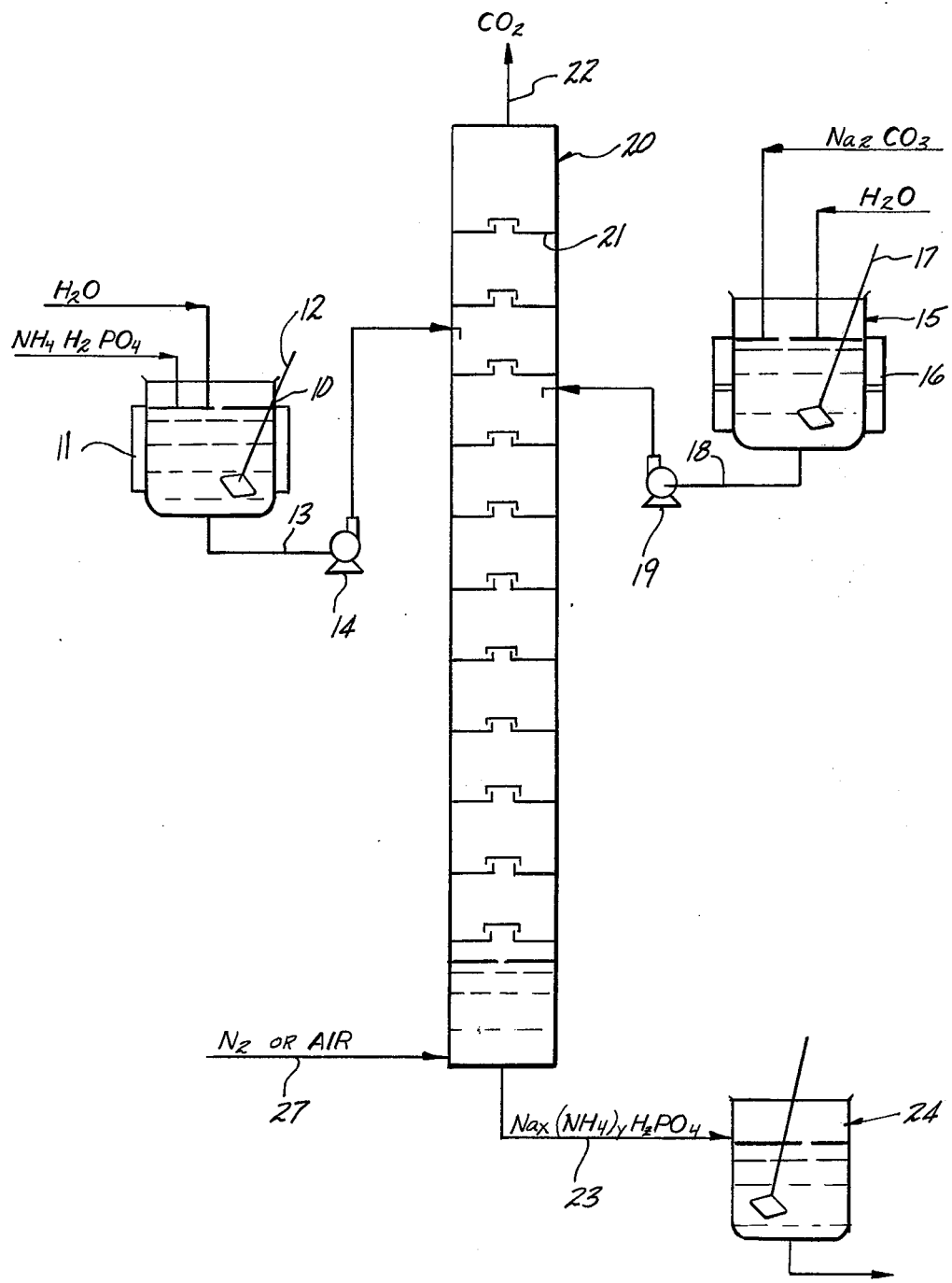

PROCESS FOR PREPARATION OF SODIUM AMMONIUM PHOSPHATE

BACKGROUND OF THE INVENTION

1. Field of Invention

The present invention relates to a method for producing a solution of sodium ammonium phosphate having a reduced carbon dioxide content by the reaction of monoammonium phosphate and sodium carbonate at elevated temperature in a vertical column having vapor-liquid contact means whereby carbon dioxide is removed from the reaction mixture while substantially all ammonia is retained in the product.

The solution thus formed may be utilized as a source for crystalline sodium ammonium phosphate or as an intermediate in the preparation of various sodium phosphates, pyrophosphates and polyphosphates for example in the process disclosed in U.S. Pat. Appln. Ser. No. 537,234 filed simultaneously herewith in which the sodium ammonium phosphate is decomposed to produce ammonia and a substantially ammonia-free solution of alkali metal orthophosphate.

DESCRIPTION OF THE PRIOR ART

It is known to react monoammonium phosphate with sodium hydroxide (caustic) to produce sodium ammonium phosphate in accordance with the following equation:

$$NH_4H_2PO_4 + NaOH \rightarrow NaNH_4HPO_4 + H_2O \quad (I)$$

It is also known to prepare sodium ammonium phosphate utilizing sodium carbonate according to the following equation:

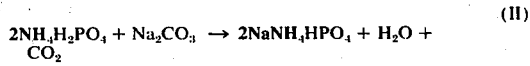

$$2NH_4H_2PO_4 + Na_2CO_3 \rightarrow 2NaNH_4HPO_4 + H_2O + CO_2 \quad (II)$$

Where it is desired to employ the solution formed according to equations I or II as an intermediate in the preparation of sodium phosphates, equation I would appear to be the route of choice in that it circumvents problems which may arise during a subsequent ammonia recovery step due to the presence of carbon dioxide, carbonates or bicarbonates. While this would appear to dictate in favor of a route utilizing equation 1, the differential between the price of caustic soda and soda ash or trona as a source of sodium carbonate would dictate in favor of the route of equation II if the carbon dioxide could be economically and effectively removed prior to ammonia recovery.

The separation of carbon dioxide from ammonia, however, is notoriously difficult and at best would require one or more additional processing steps. No means has previously been found for thermally separating carbon dioxide from an ammonium phosphate containing reaction mixture without simultaneously separating, and thus losing, a substantial amount of ammonia. If, for example, one attempts to heat the mixture of conduct the reaction at elevated temperature up to about 40% of the ammonia will be expelled with the carbon dioxide. This in and of itself represents a substantial loss of ammonia and to avoid this loss, an additional separating step would be required. Furthermore, as the carbon dioxide/ammonia mixture cools, carbamates may form, precipitate, and plug process lines. The formation of carbamates increases corrosion in process lines and processing equipment and thus substantially decreases its useful life.

In addition, the presence of excessive amounts of carbon dioxide during a high temperature ammonia recovery step will complicate ammonia recovery and/or contaminate either the ammonia or the solution of sodium ammonium phosphate or both.

In order to avoid these losses and complications and to take advantage of the price differential between soda ash and caustic, it is advantageous and the principal object of the present invention to provide a method for forming a solution of sodium ammonium phosphate from monoammonium phosphate and soda ash and simultaneously removing carbon dioxide formed while avoiding the removal of ammonia from the reaction mixture.

SUMMARY OF THE INVENTION

It has been found that these and other objects of the invention may be achieved by reacting aqueous monoammonium phosphate with aqueous sodium carbonate in a vertical column having vapor-liquid contact means, the sodium carbonate being introduced at a level below the level at which monoammonium phosphate is introduced to the column. Substantially ammonia-free carbon dioxide is removed as an overhead product and an aqueous solution of sodium ammonium phosphate having a reduced carbon dioxide level is recovered therefrom as a bottoms product.

The reaction is preferably conducted continuously utilizing flow rates which provide a relatively low Na/P molar ratio, desirably in the range of 0.5–1.5, advantageously 0.6–1.2, preferably in the range of 0.7–1.1 and is preferably run at atmospheric pressure.

DETAILED DESCRIPTION

The accompanying drawing is a flow diagram showing a column suitable for use in the present invention together with supply and product removal lines communicating therewith.

In accordance with the present invention, aqueous sodium ammonium phosphate for subsequent conversion to sodium orthophosphates, polyphosphates and pyrophosphates is prepared by reacting aqueous monoammonium phosphate with a suitable source of sodium carbonate under conditions conducive to the removal of ammonia-free carbon dioxide, substantially all ammonia being retained in the liquid phase for removal in a subsequent step.

Monoammonium phosphate useful in the present process may be prepared in any desired manner. For example, it may be prepared by ammoniation of furnace grade phosphoric acid or by ammoniation of wet process phosphoric acid as shown for example, in U.S. Pat. No. 3,388,966. An aqueous solution is prepared containing any desired concentration of monoammonium phosphate. Suitably, any concentration, for example, up to about 70 wt. %, advantageously 10 to 70 wt. % may be employed. It is preferred that a fairly concentrated solution be utilized and accordingly, the solution may be heated if desired to any desired temperature up to its boiling point, 110°–111°C. at maximum concentration, to increase the amount of monoammonium phosphate which may be dissolved therein. Generally, such heating will not cause a noticeable loss of ammonia but if a noticeable odor of ammonia develops the temperature should be reduced slightly to minimize ammonia loss.

A slurry of monoammonium phosphate may also be employed if desired if a column provided with vapor-liquid contact means capable of handling solids is utilized or if the concentration of monoammonium phosphate is limited to a concentration which will readily dissolve when subjected to elevated temperature in the column.

Referring to the drawing a storage tank 10 of any suitable size and shape is provided for storing the ammonium phosphate solution. Tank 10 is suitably heated by any suitable means, for example, by electrical heaters 11. Tank 10 is suitably provided with an agitator 12 and an outlet communicating feed line 13 which is provided with metering pump 14.

Any suitable source of sodium carbonate, for example, soda ash trona and even sodium bicarbonate, but perferably soda ash, may be utilized as a solution or slurry in the present process. The solution or slurry may be heated if desired prior to introduction into the reaction chamber or column. The solution or slurry is suitably stored in storage tank 15 which is heated by electrical heaters 16. Tank 15 is suitably provided with agitator 17 and with an outlet communicating with feed line 18 provided with metering pump 19.

The column 20 preferred for use in the present process is an elongated vertical column having suitable vapor-liquid contact means 21 therein. Preferably, the column has a height substantially greater than its width, for example, in a height to width ratio of 10:1 to 250:1 depending on the type and efficiency of the vapor-liquid contact means employed. Suitable vapor-liquid contact means includes, for example, plates, sieves, beads, or other packing materials all of which are well known to those skilled in the art.

A typical column for use in the invention on a small scale is one which is, for example, 2 inches in diameter by 20 feet tall made of stainless steel or any other suitable material. As shown in the drawing the column is provided with vapor-liquid contact means 21 throughout a major portion of its length. A vapor line 22 exits from the top of the tower for removal of carbon dioxide and a product removal line 23 exits from the bottom of the tower to a sodium ammonium phosphate storage tank 24 or to a further processing station (not shown).

Column 20 may be maintained at any desired pressure but it is clearly preferable to operate at atmospheric pressure. No substantial advantage is realized by operating at elevated pressure or under vacuum. It is preferable, however, to operate the column at elevated temperature and for this purpose a bottom reboiler or other suitable heating means (not shown) is employed. Suitably, an elevated temperature in the range of 125°F. to 250°F. is advantageously employed and there is no reason to exceed these limits unless it is desired to reduce carbon dioxide to extremely low values, for example, below about 25–50 ppm. If operating in the lower portion of this range, however, for example, in the range of 125°F. to 175°F., it may be desirable to uitilize an inert stripping gas such as air or nitrogen. This is generally not required when operating in the upper portion of the range (175°–250°C.), particularly if the boiling point of the solution is attained, but may nevertheless be utilized if desired. If a stripping gas is utilized, it is preferably introduced into the lower portion of the column, for example, via line 27. The stripping gas may suitably be preheated by any known means prior to introduction.

The aqueous monoammonium phosphate is advantageously introduced into the upper half of the column (20), preferably at a point near the top of the tower in order to maximize efficiency thereof. A small space above the injection point, for example 1–3 feet is all that is required for disengagement of carbon dioxide.

The aqueous sodium carbonate solution is introduced into the tower at a level below the point of introduction of the monoammonium phosphate via line 18, at a rate sufficient to provide and maintain an Na/P molar ratio in the column of from about 0.5–1.5, advantageously 0.6–1.2. Most efficient carbon dioxide stripping appears to be attained by utilizing feed rates which provides an Na/P molar ratio in the range of 0.7–1.1 at a temperature of about 170°F. to about 225°F.

Upon introduction of the monoammonium phosphate and sodium carbonate the former is permitted to flow downwardly in the column into contact with the sodium carbonate which has been introduced below and which is also flowing downwardly toward the bottom of the column. Upon such co-current contact the reaction according to equation II, supra, takes place causing the release of carbon dioxide, water vapor and ammonia vapors. The vapors thus released rise in the column in countercurrent contact with the reaction mixture and eventually reach a level where they are in contact only with the monoammonium phosphate solution. At this point any free ammonium is converted to ammonium ion, absorbed into solution and thus removed from the ascending vapors and returned to the reaction mixture to be retained in the resulting bottoms product. The resulting by-product $CO_2$ is either vented or recovered, suitably together with water vapor, and is substantially ammonia free; that is to say the overhead vapors contain an ammonia content of not more than about 25–50 ppm, advantageously 0–25 ppm, preferably 0–5 ppm, and ideally less than 1 ppm.

The bottoms product, i.e., that recovered from the bottom of column 20 via line 23, is an aqueous solution of reduced carbon dioxide content corresponding to sodium ammonium phosphate, i.e., having the approximate formula $Na_x(NH_4)_yH_zPO_4$ wherein $x$ is 0.5–1.5, desirably, 0.6–1.2, and preferably 0.7–1.1, $y$ is about 1 (representing substantially all ammonia present in the monoammonium phosphate feed stream) and $z$ equals a value not less than zero equal to $3 - (x + y)$. The carbon dioxide level in the product is suitably 0–500 ppm, preferably 0–100 ppm. If carbon dioxide is recovered and sold as a by-product of the process, it is desirable to reduce the carbon dioxide levels to less than 500 ppm, preferably 0–100 ppm to maximize carbon dioxide yield. If the carbon dioxide is not recovered for re-sale or re-use, substantially higher levels are permissible in the liquid product but at present it is not known at what level the carbon dioxide becomes a problem insofar as ammonia losses or complications arising in ammonia recovery are concerned.

The following examples demonstrate the present process.

EXAMPLE I

An aqueous solution containing 42.5 wt. % reagent grade monoammonium phosphate, preheated to 160°F. was introduced into a 2-inch by 20-foot column at a level of about 2 feet from the top of packed portion of the tower, at a rate of about 150 cc per minute. The column was packed with ¼-inch size "Pro-pack" packing made of stainless steel 316 mesh. This was estimated to provide the equivalent of about 120 theoretical plates. An aqueous solution of soda ash containing 23 wt. % $Na_2CO_3$ was introduced at a level of about 10 feet from the top of packed portion of the tower at a rate of 120 cc per minute. In several runs the bottoms temperature was varied between 160°F. and 215°F. The molar ratio of the resulting product and the carbon dioxide content is shown below. VPC analysis of the overhead vapors indicated ammonia content of less than 500 ppm, the limit of detectability. A microkjeldahl analysis, sensitive to 1 ppm, indicated no detectable ammonia in the overhead vapors.

| SAMPLE | COLUMN BOTTOM TEMP.°F. | BOTTOMS PRODUCT Na/P MOLAR RATIO | BOTTOMS PRODUCT $CO_2$ CONC. (PPM) | $CO_2$ VAPORS $NH_3$ CONTENT + (PPM) |
|---|---|---|---|---|
| 1.1 | 160 | .76 | 600 | < 1 |
| 1.2 | 170 | .75 | 700 | < 1 |
| 1.3 | 205 | .77 | < 100 | < 1 |
| 1.4 | 208 | .77 | < 100 | < 1 |
| 1.5 | 212 | .75 | 100 | < 1 |
| 1.6 | 215 | .70 | < 100 | < 1 |

EXAMPLE II

A second series of runs were conducted as in Example I but using monoammonium phosphate prepared by ammoniating wet process phosphoric acid to a pH of about 4.2, filtering precipitated impurities and crystallizing monoammonium phosphate from the remaining liquid. The monoammonium phosphate solution contained 38.8 wt. % solids and was fed at a rate of 151 cc/minute. The solution of soda ash contained 29.4 wt. % solids and was fed into the column at a rate of 120 cc/minute. A stripping stream of nitrogen was utilized at 2-5 l/minute. The ammonia content of the vapors was in all instances below 1 ppm.

| SAMPLE | COLUMN BOTTOM TEMP. °F. | BOTTOMS PRODUCT Na/P MOLAR RATIO | BOTTOMS PRODUCT $CO_2$ CONC. (PPM) | $CO_2$ VAPORS $NH_3$ CONTENT (PPM) |
|---|---|---|---|---|
| 2.1 | 223 | 0.9 | 4600 | < 1 |
| 2.2 | 225 | 0.9 | 1400 | < 1 |
| 2.3 | 185 | 0.9 | 1100 | < 1 |
| 2.4 | 187 | 0.9 | 300 | < 1 |

I claim:
1. A process for preparing a solution of sodium ammonium phosphate and carbon dioxide which comprises:
   a. introducing aqueous monoammonium phosphate into a substantially vertical column provided with vapor-liquid contact means,
   b. introducing aqueous sodium carbonate into said column at a level below that at which said monoammonium phosphate is introduced at a rate sufficient to maintain in said column a Na/P molar ratio in the range of 0.5-1.5,
   c. permitting said monoammonium phosphate to flow downwardly into continuous co-current contact and react with said sodium carbonate at a temperature of 125-250°F., and
   d. removing from said column an overhead product comprising substantially ammonia-free carbon dioxide and simultaneously recovering a bottoms product comprising a solution of sodium ammonium phosphate having a reduced carbon dioxide level.
2. The process of claim 1 wherein said Na/P molar ratio is in the range of 0.6–1.2
3. The process of claim 1 wherein said solution of sodium ammonium phosphate has a carbon dioxide level of less than 500 ppm.
4. The process of claim 1 wherein said Na/P molar ratio is in the range of 0.7–1.1 and said temperature is in the range of 170°F. to 225°F.

* * * * *